United States Patent
Noe'

(10) Patent No.: US 11,845,094 B2
(45) Date of Patent: Dec. 19, 2023

(54) MACHINE FOR THE SURFACE PROCESSING OF PRODUCTS

(71) Applicant: ASTRO S.R.L., Massa (IT)

(72) Inventor: Alessio Noe', Montignoso (IT)

(73) Assignee: ASTRO S.R.L., Massa (IT)

( * ) Notice: Subject to any disclaimer, the term of this patent is extended or adjusted under 35 U.S.C. 154(b) by 0 days.

(21) Appl. No.: 17/623,164

(22) PCT Filed: Jun. 25, 2020

(86) PCT No.: PCT/IB2020/056016
§ 371 (c)(1),
(2) Date: Dec. 27, 2021

(87) PCT Pub. No.: WO2020/261172
PCT Pub. Date: Dec. 30, 2020

(65) Prior Publication Data
US 2022/0355326 A1  Nov. 10, 2022

(30) Foreign Application Priority Data

Jun. 28, 2019  (IT) .................. 102019000010422

(51) Int. Cl.
| | | |
|---|---|---|
| B05B 13/02 | (2006.01) | |
| B05B 16/00 | (2018.01) | |
| B65G 47/51 | (2006.01) | |

(52) U.S. Cl.
CPC ...... B05B 13/0221 (2013.01); B05B 13/0292 (2013.01); B05B 16/95 (2018.02); B65G 47/5181 (2013.01); *B65G 2201/022* (2013.01)

(58) Field of Classification Search
USPC .......................................... 118/50, 324, 500
See application file for complete search history.

(56) References Cited

FOREIGN PATENT DOCUMENTS

| CN | 102343627 B | 1/2015 |
|---|---|---|
| DE | 102008026314 A1 | 12/2009 |

(Continued)

OTHER PUBLICATIONS

English Translation DE102008026314B4 (Year: 2010).*

*Primary Examiner* — Yewebdar T Tadesse
(74) *Attorney, Agent, or Firm* — McGlew and Tuttle, P.C.

(57) ABSTRACT

Machine for the surface processing of products (L) under controlled pressure conditions different than the ambient pressure, comprising • at least one sealed chamber (12, 13), provided with at least one opening (15, 16), that can be closed, for inserting and removing a plurality of products (L) to be processed, • a device (30) for adjusting the pressure inside said at least one chamber (12, 13), • in said at least one chamber (12, 13), a moving device (20) for vertically moving said products (L), so as to accumulate at least two said products on levels arranged over one another, • a horizontal moving device (19) for moving said products (L) from and towards said at least one opening (15, 16) when the products (L) are arranged at the same level of said at least one opening (15, 16) wherein, from an operational viewpoint, a plurality of said products (L) are inserted into said at least one chamber (12, 13), and at least two products of said plurality of products (L) are over one another for a span of processing, and wherein, once all the products to be processed have been inserted into said at least one chamber, (12, 13) said chamber (12, 13) is closed and the pressure inside is adjusted up to an operational processing pressure, and then said at least one chamber (12, 13) is opened again and the products (L) are removed therefrom.

15 Claims, 4 Drawing Sheets

(56) References Cited

FOREIGN PATENT DOCUMENTS

WO 2004110744 A1 12/2004
WO 2018073776 A1 4/2018

\* cited by examiner

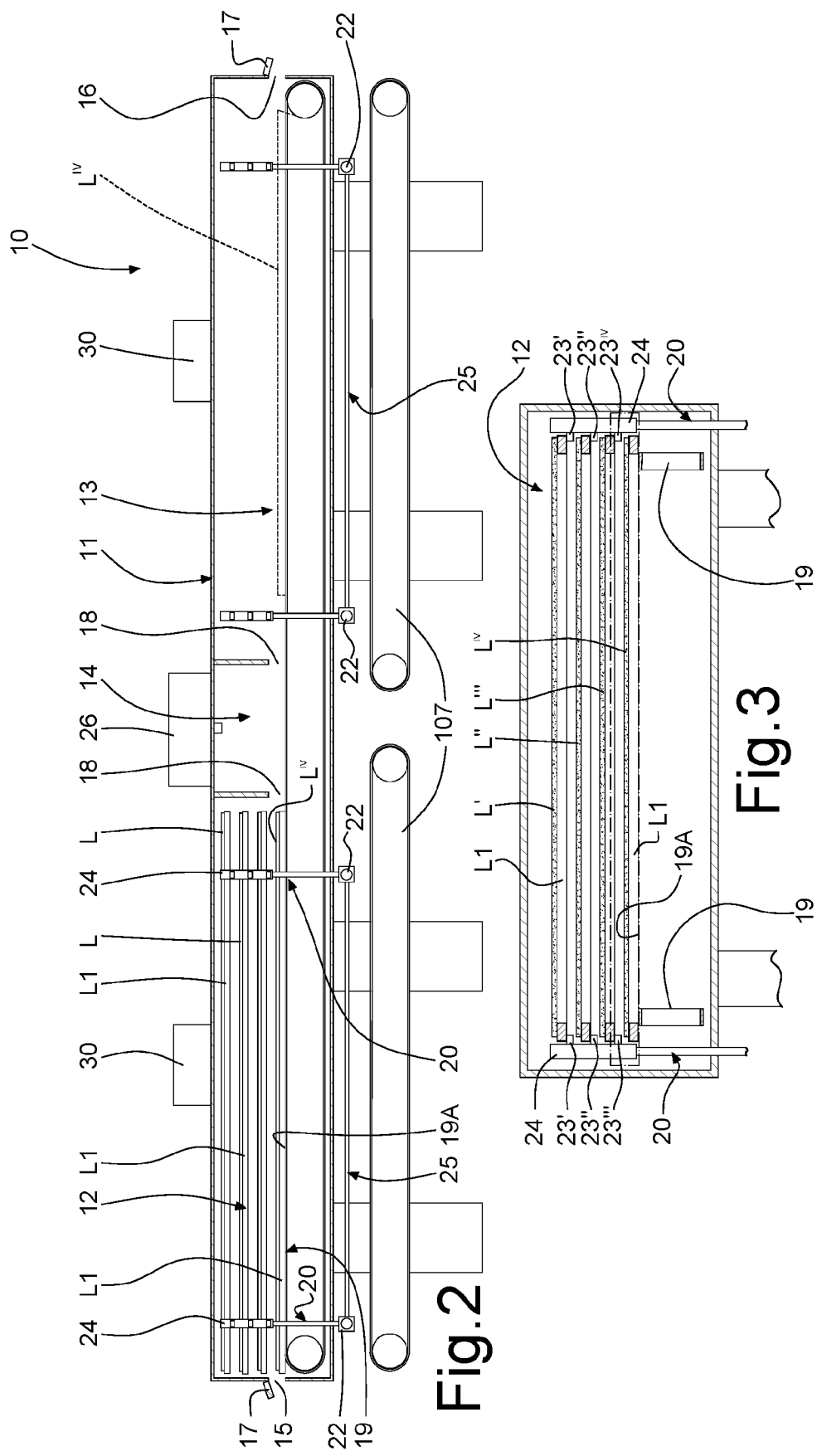

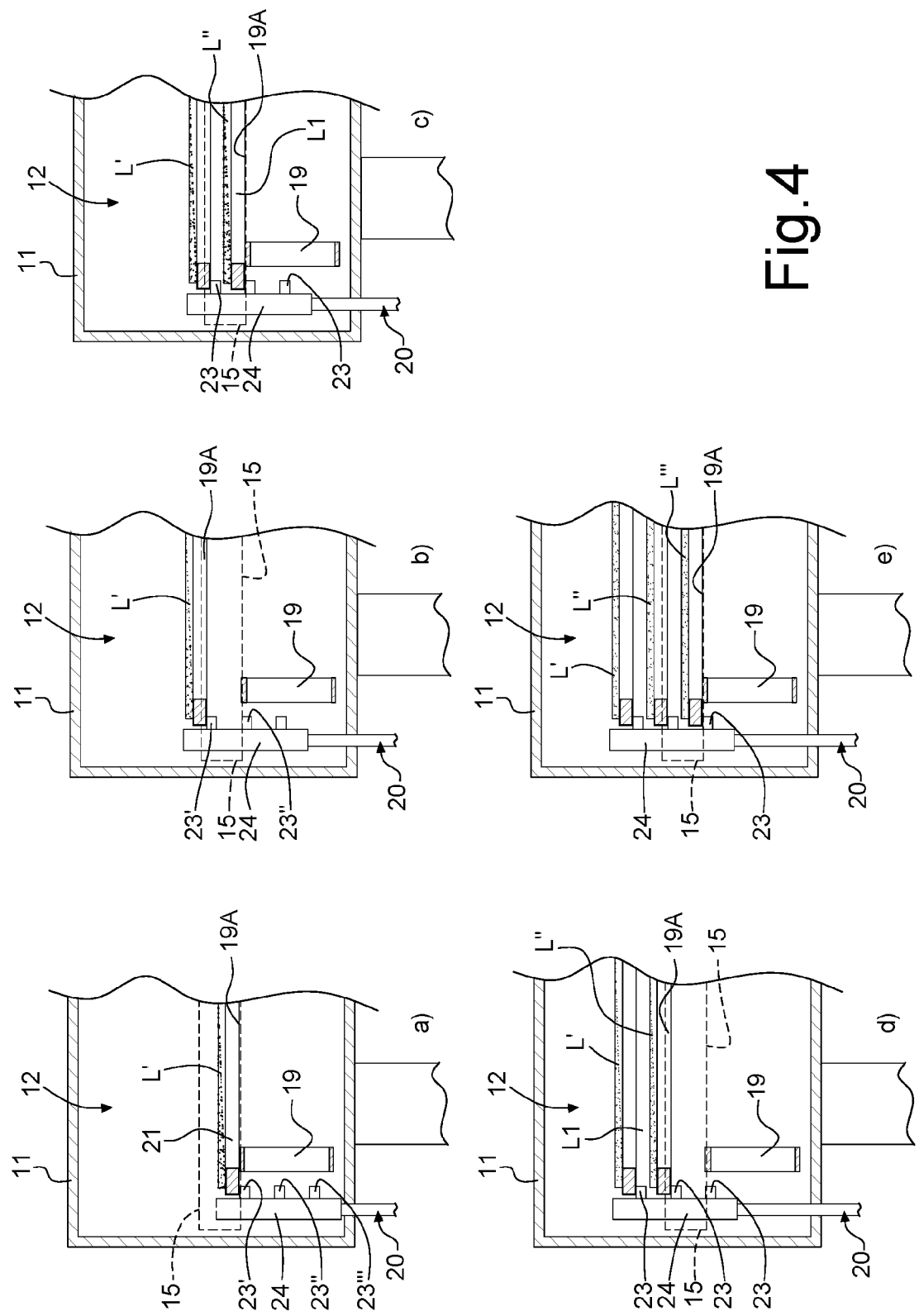

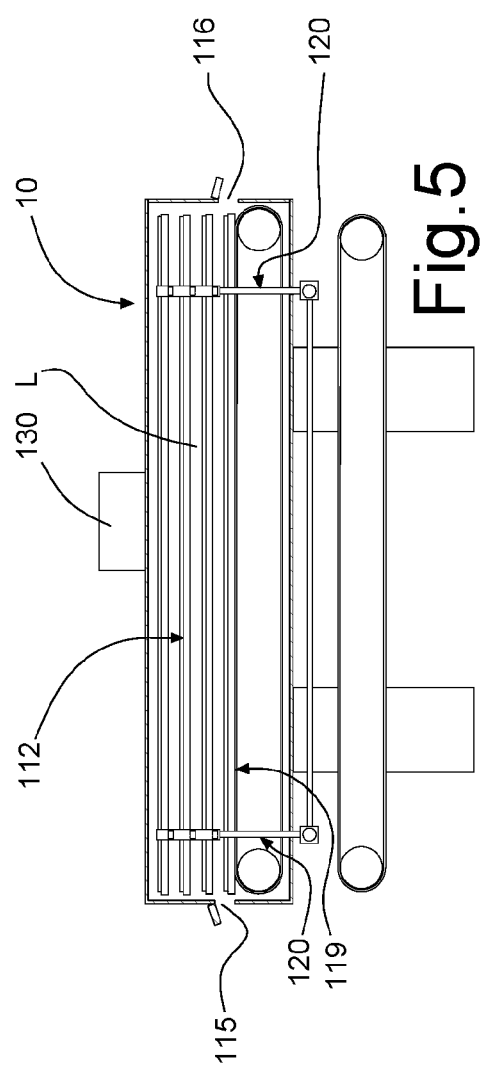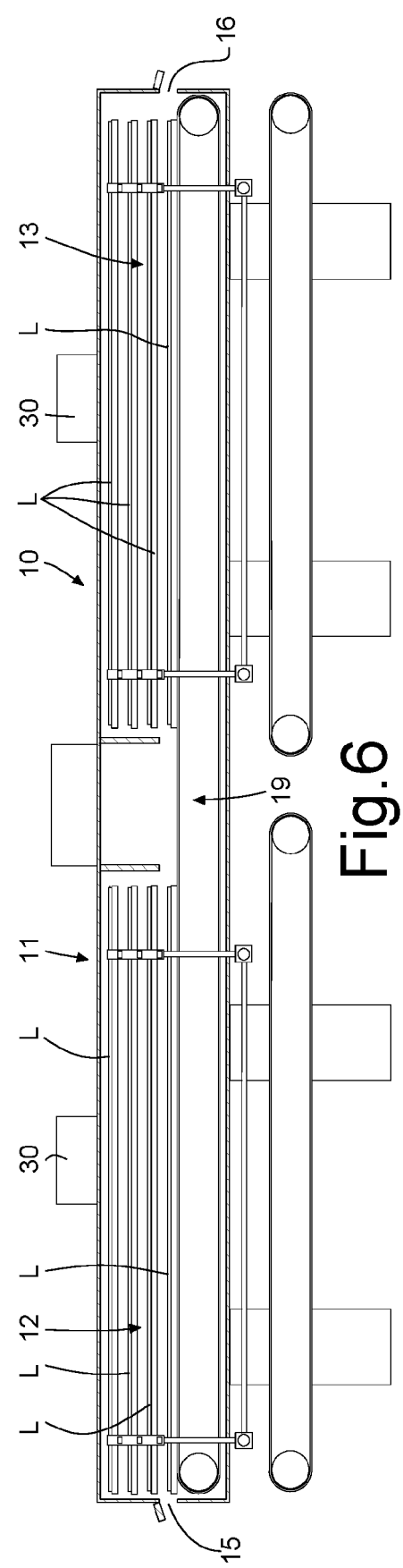

MACHINE FOR THE SURFACE PROCESSING OF PRODUCTS

TECHNICAL FIELD

This invention relates to the surface processing of products, in particular, although not exclusively, of slab-shaped products, such as resin-based processing, painting, protective coating etc. More in particular, the object of the invention is a machine for the surface processing of products, the machine working at lower pressure than ambient pressure.

State of the Art

As it is well known, in the production of slabs of stone material there is often the need for surface processing the products.

For example, the natural stone materials used in the construction field, such as marbles, granites and the like, shall be mostly treated with epoxy resins, that can be single-component resins or two-component resins, so as to improve the chemical and mechanical features thereof or simply the appearance thereof. The resins enter the cracks in the slabs, thus reinforcing the slabs and giving them a homogeneous surface.

A resin application station is disclosed, for example, in the patent application no. WO2018073776, where an anthropomorphic arm carrying a resin applicator, for example a resin distribution roller, moves within a resin application space defined above a conveyor belt module. When the slab enters the resin application station, the resin applicator applies epoxy resin to the surface thereof. Often, a vacuum station, i.e. a station where the pressure is significantly lower than the ambient pressure, is provided immediately downstream of the resin application station. The slab, to which the resin has been applied, enters this station, where the pressure is as close as possible to the vacuum. The pressure difference eliminates the air inside the closed space, thus allowing the resin deeply to enter the cracks in the slab. After the vacuum step and any necessary finishing, the slab is put in an oven where the resin is dried.

Further steps could provide for applying paint layers or other protective coatings to the slab. According to the specific need, all these processes are often performed under vacuum conditions.

Generally speaking, each slab is processed individually through all processing stations, where the slab is introduced into a depressurized chamber.

The time t(1) necessary for completely processing a single slab, i.e. a single product, in a processing chamber can be schematically subdivided as follows:

$t(1)=t(e)+t(c)+t(r)+t(m)+t(s)+t(a)+t(u)$, where:

t(e) time for entering the product into the chamber,
t(c) time for closing the chamber doors,
t(r) time for achieving the working pressure (that depends upon the chamber volume and the generator capacity),
t(m) time for keeping/processing the product under the achieved working pressure,
t(s) time for achieving the ambient pressure again (that depends upon the chamber volume),
t(a) time for opening the chamber doors,
t(u) time for exiting the product.

Based on what above, the time for processing a number n of products is: $t(1 \ldots n)=n^*t(e)+n^*t(c)+n^*t(r)+n^*t(m)+n^*t(s)+n^*t(a)+n^*t(u)$ where "*" indicates the multiplication sign.

SUMMARY

An object of the invention is to provide a machine for the surface processing of products under lower pressure than the ambient pressure, allowing reducing the processing time when it is necessary to process a plurality of products A further object of the invention is to provide a machine for the surface processing of products at lower pressure than the ambient pressure, allowing reducing the plant bulk, thus improving the productivity thereof.

These and other objects, that will be better described below, are achieved through a machine for the surface processing of products, comprising:

at least one sealed chamber, provided with at least one opening, that can be closed, for inserting and removing a plurality of products to be processed,
a device for reducing the pressure inside said at least one chamber up to a value lower than the ambient pressure,
in said at least one chamber, a moving device for moving said products from the bottom upwards and in reverse, so as to accumulate at least two products on levels put over one another,
a plan moving device for moving the products from and towards said at least one opening when the products are arranged at the same level of said at least one opening,
wherein, from an operational viewpoint, a plurality of said products are inserted into said at least one chamber, and at least two products of said plurality of products are over one another for a span of processing, and wherein, once all the products to be processed have been inserted into said at least one chamber, said chamber is closed and the pressure inside is decreased up to an operational processing pressure, and then said at least one chamber is opened again and the products are removed therefrom.

"Plan moving" means, for example, a longitudinal moving, for instance from the right to the left or vice versa, such as preferably a substantially horizontal movement.

With reference again to the above example, the invention provides for sharing some of the steps mentioned above among n products; in this way, the new time necessary for processing the n products, that are all arranged in the chamber at the same time, is: $t'(1 \ldots n)=n^*t(e)+t(c)+t'(r)+t(m)+t(s)+t(a)+n^*t(u)$.

Clearly, in order that t(r), that is time for achieving the working pressure, is the same for both cases t(1) and t'(1 . . . n), it would be necessary to provide a machine where the net free volumes in the two cases are as close as possible.

Practically, it is not possible to have the same t(r) in both cases (n products inserted and processed in the processing chamber one after the other, or n products stacked over one another in the processing chamber and then processed). However, it is possible to ensure that t'(r) (new time for achieving the target working pressure) is such as to satisfy the following relationship: $t(r)<t'(r)<n^*t(r)$.

The same reasoning can be for t'(s) (new time for achieving the ambient pressure again), where the relationship is: $t(s)<t'(s)<n^*t(s)$.

The other times t(e), t(c), t(m) and t(u) substantially remain the same.

It is therefore clearly apparent that through the machine of the invention the overall time t'(1 . . . n) for the surface processing of the product is lower than that of the prior art.

As mentioned above, the surface treatments can be, in general, of two kinds.

The treatments of the first kind provide for keeping the products under given depressurization conditions, for example in all cases where it is necessary to increase or improve the penetration of a given fluid inside a solid so as to impregnate this latter and to give it better physical-mechanical features. A practical example of this first kind of treatments is the impregnation of products, such as slabs of natural stone, with bicomponent mixtures of epoxy resin or with silicates mixtures. In this case, the processing time coincides with the keeping time, as they are substantially the same.

For these treatments, in an embodiment the machine of the invention provides for a single sealed chamber where the stacked products are inserted. Anyway, in other embodiments the machine may even provide for a plurality of sealed chambers arranged one following the other.

In the second kind of treatments, achieving a given pressure value lower than the ambient pressure is a necessary (better, an optimal) condition for performing the actual processing. An example thereof is the application, on the product surface, of one or more layers, for example a vacuum painting or, more in general, the deposition of given elements on the surface of the product to be treated.

In this second kind of treatments, by using at least two chambers in succession and communicating each other, between which a processing device is arranged, it is possible to apply a given material to the products surface, so that, when passing from a chamber to the other, the products can be processed.

In order to make the chamber as small as possible, it is necessary that the chamber has such an overall minimal length to house two products of the maximal processable length.

By arranging the device performing the specific treatment (just by way of example a nozzle, a spraying gun, a brush, a roller, a blade, a plasma source etc.) in central position, the product can move forwards and backwards to receive the desired material.

Therefore, in general, the processing machine according to preferred embodiments comprises at least two sealed chambers connected to each other, each chamber being adapted to receive a plurality of products put over one another.

When at least one surface layer of material shall be applied to the product, a surface processing device can be adequately arranged between the two sealed chambers.

Preferably, between said at least two chambers a processing room is provided, where said surface processing device is arranged, so that the products are adapted to move from a chamber to the following one passing through the room, realizing the processing.

Preferably, only two sealed chambers are provided, arranged in succession.

Preferably, the horizontal moving device is adapted to allow the products to pass from a chamber to the following one under the processing device.

The horizontal moving device is preferably common to the sealed chambers; preferably the horizontal moving device is a conveyor belt crossing the chambers from an entrance first opening of the machine up to an exit second opening of the machine, passing under the processing device.

Preferably, the length of the processing room, i.e. the dimension corresponding to the movement direction of the products in the machine, is lower than that of the sealed chambers.

According to preferred embodiments, the machine comprises a first opening for the products entering the machine, defined in the first sealed chamber, and a second opening for the products exiting the machine, defined in a second sealed chamber; respective sealing doors, that can be opened and closed, are associated with the openings.

According to preferred embodiments, in each chamber a moving device is provided for moving said products from the bottom upwards and vice versa, so as to accumulate at least two products over one another.

According to referred embodiments, in at least two chambers there is defined a moving plane for moving the products from the entrance to the exit of the machine, crossing the chambers passing under the processing device, wherein each bottom-upwards moving device defines N positions raised from the moving plane, and wherein the maximal number of products that can be processed in the machine is N+1.

According to preferred embodiments, the surface processing device is a vacuum painting device, a vacuum plasma processing device, a vacuum resin applying device.

According to preferred embodiments, each product is borne by a respective support, so that the products enter and exit the machine on these supports, and the bottom-upwards moving device and the plan moving device are adapted to move the products by directly moving these supports.

According to preferred embodiments, the machine is adapted to process products in the form of slabs preferably made of stone, wood, ceramic, glass or metal.

BRIEF DESCRIPTION OF THE DRAWING

The invention will be better understood by following the description below and the attached drawing, showing a non-limiting embodiment of the invention. More particularly, in the drawing:

FIG. 2 is a schematic side view, partially cut-away longitudinally, of a surface processing machine with a double sealed chamber;

FIG. 3 is a schematic front view, partially cut-away transversally, of the processing machine of FIG. 2;

Figure 1:
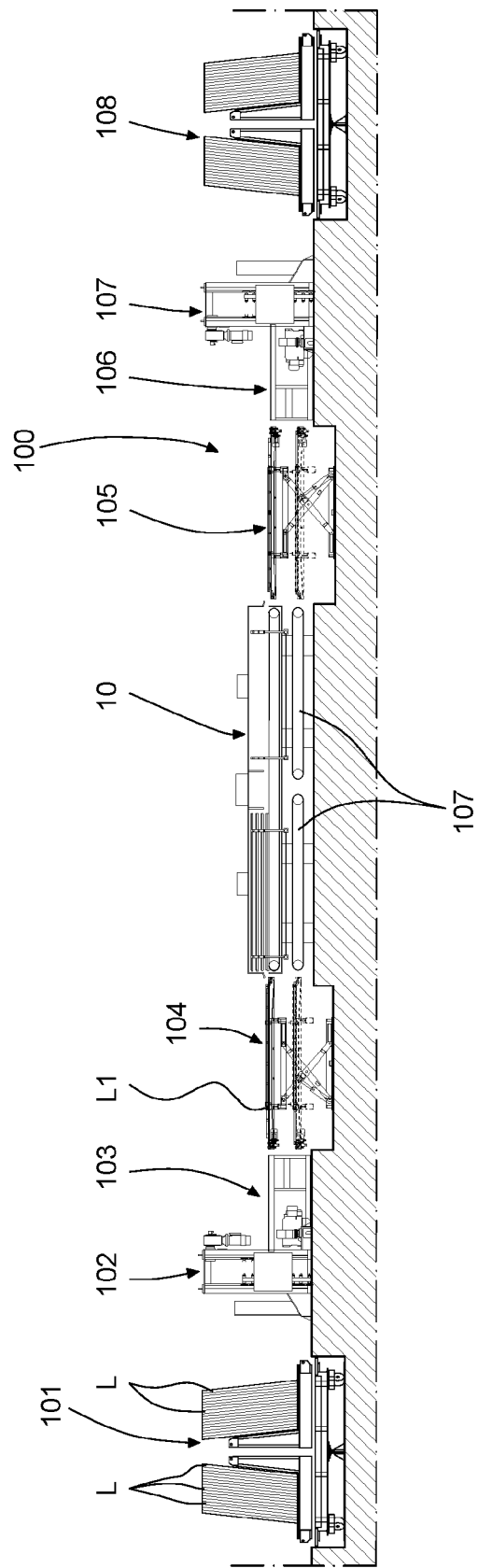
FIG. 1 is a schematic side view of a line of a surface processing plant using the processing machine of the invention.

each of FIGS. 4a to 4e is a schematic front view, partially cut-away transversally, of a portion of the processing machine of FIG. 2, relating to a specific step of loading the products in the sealed chambers of the machine;

FIG. 5 is a schematic side view, partially cut-away longitudinally, of a variant of the processing machine of the invention, provided with only one sealed chamber;

FIG. 6 is a schematic side view, partially cut-away longitudinally, of the machine of FIG. 2 with both the sealed chambers loaded for performing a pressure surface processing, according to a treatment method different from that illustrated in FIGS. 2 to 4.

DETAILED DESCRIPTION OF EMBODIMENTS

With reference to the aforementioned figures, a machine for the surface processing of products according to the invention is indicated as a whole with the reference number 10. It is inserted in a processing line indicated with 100. More in particular, in this example the line is a line for the surface processing of slabs L made of stone, such as marble, granite and the like, or of glass, wood, ceramic, metal etc. The line is well known, with the exception of the part relating to the processing machine 10.

The lines 1 comprises, in succession, a rotating storage space 101 for slabs L, an automatic loader 102 taking the slabs L from the storage space 101 and putting them on a comb-shaped loading conveyor table 103 transferring the slabs L onto a first pantograph lifting device 104.

This latter allows arranging the slabs at the level where they can enter the processing machine 10 of the invention, described below.

At the exit from the processing machine 10 a second pantograph lifting device 105 is provided, bringing the slabs to the level of a comb-shaped unloading conveyor table 106, after which an automatic unloader 107 and a further rotating storage space 108 for slabs L are provided.

Adequately, in correspondence of the first pantograph lifting device 104, a support L1 for a slab L is provided, in the form of a mainly flat metal frame comprising poles and crossbars, onto which the slab is fastened in a flat fashion. For each slab arriving on this first pantograph lifting device 104, a corresponding support L1 is provided for moving the slab inside the processing machine 10.

Analogously, the set of support L1 and slab L arriving from the machine 10 onto the second pantograph lifting device 105 is separated, wherein the slab is put on the comb-shaped unloading conveyor table 106 and the support L1 returns to the comb-shaped loading conveyor table 103 through a pair of movable belts 107 provided below the machine 10.

From a practical viewpoint, a number of supports L1 is provided at least equal to the number of slabs to be processed in the processing machine 10, as it will be better explained below. For example, in the case illustrated in the figure, the number of supports is equal to the number of slabs to be treated in the machine 10 plus four. The surface processing machine 10 comprises a casing 11, internally defining two consecutive sealed chambers, respectively a first sealed chamber 12 and a second sealed chamber 13, separated through an intermediate room 14.

The first sealed chamber 12 comprises an entrance first opening 15 for a support L1 (bearing a first slab L; here below this set will be referred to as "support-slab L") entering the machine 10. The second sealed chamber 13 comprises an exit second opening 16 for a support-slab L. Respective sealing doors, that can be opened and closed, are associated with these openings.

The room 14, arranged between the two chambers 12 and 13, has two passages 18 for accessing the two chambers.

A plan moving device 19, i.e. a device for moving longitudinally, i.e. from the right to the left and in reverse, such as a horizontal moving (where movements according to a more or less inclined direction are even possible) is realized for example through a chain conveyor (defined by two lateral chains spaced from each other) arranged in the machine 10 and extending according to a rectilinear direction from the first opening 15 to the second opening 16 and vice versa, passing through the passages 18 of the intermediate room 14, i.e. crossing this room. It should be noted that the plan moving device 19 practically defines a moving plane 19A for the support-slab L, aligned with, i.e. crossing, the openings 15 and 16 and the passages 18.

In each chamber 12, 13 a respective moving device 20 is provided for moving, from the bottom upwards and in reverse, i.e. in this example in substantially vertical direction, the supports-slabs L entering the respective chamber, in order to accumulate the supports-slabs L on levels arranged over one another.

For example, each vertical moving device 20 comprises a rack defining a plurality of lower resting levels arranged over one another, where the supports-slabs can rest. Through one or more translation actuators 22 the rack translates vertically, lifting in succession the supports-slabs following one another in the respective chamber, resting on the conveyor belt 19.

In particular, the rack comprises two side support flanks, each of which defines rests 23 for the supports-slabs, that are vertically spaced. More in particular, each flank is formed by two horizontally spaced vertical uprights 24, along which the rests 23 project.

In plan view, the vertical uprights 24 are outside the conveyor belt 19, so that the rests 23 do not interfere with the conveyor belt 19 (see FIGS. 3 and 4). Furthermore, the supports-slabs L are wider than the conveyor belt 19, thus allowing the rests 23 abutting below the side edges of the same supports-slabs L.

The translation actuators 22 can be for example four worm actuators, the movable sliders of which are integral with the respective vertical uprights 24.

The worms of the actuators are connected to a gear motor actuation system 25 provided with pinions and wheels with threaded bar.

The intermediate room 14 is a room where the surface processing is performed (at a pressure lower than the ambient pressure, i.e. under depressurized or vacuum conditions, i.e. A pressure value approximately equal to zero) and where a surface processing device 26 (preferably arranged on the top of the room 14) works, for example a resin applying device, a painting device or a plasma processing device.

A surface processing device 26 arranged on the top of the room 14 may be, for example, a vacuum painting device or a vacuum finishing applying device. The nozzle of the device deposits the material onto the slab L passing through the room 14 (through the passages 18) from the first chamber 12 *t* the second chamber 13 and/or vice versa (one or more times).

To allow the vacuum processing, the machine also comprises a known device 30 for reducing the pressure in the at least one chamber, which is part of an air suction system, not illustrated in the figures for the sake of simplicity.

From an operational viewpoint, the slabs L, borne by the support L1, enter one by one the first sealed chamber 12 through the first opening 15, with the aid of the conveyor belt 19. When the first slab L' enters the first chamber 12, it stops in correspondence of the rack of the vertical moving device 20. The moving device 20 has the vertical uprights 24 completely lowered, so that the first rests 23' of the vertical uprights 24, i.e. the ones arranged at the top, are at the same level as the support-slab moving plane 19A, i.e. below the supports-slabs (FIG. 4*a*).

The vertical moving device 20 is actuated and the vertical uprights 24 are lifted up to bring the second subsequent rests 23", that are at a lower level relative to the first rests 23', up to the support-slab moving plane 19A. Obviously, the first slab L' is lifted with respect to this moving plane by a distance greater than the thickness of the set support-slab (FIG. 4*b*).

Analogously to what above, a second slab L" enters the first chamber 12 and stops in correspondence of the rack of the vertical moving device 20 (i.e. below the first slab L', which is above the second slab). The moving device 20 is actuated and the second slab L" (i.e. the set support-slab), supported by the subsequent second rests 23", is translated upwards. Analogously, also the first slab L' is translated upwards. Subsequent third rests 23" of the vertical uprights 24 are at the same level as the support-slab moving plane, so as to receive a new support-slab (FIG. 4*d*).

This procedure goes on based on how many levels or overlapping positions N have been provided for the machine. In the case illustrated in the figures, three levels are provided, arranged over one another, defined by three sets of rests 23.

The last slab $L^{IV}$ inserted into the first chamber 12 remains on the conveyor belt 19 (FIG. 3). The sealing doors 17 are closed and the pressure inside the machine (i.e. the pressure in the common ambient formed by the first chamber 12, the second chamber 13 and the room 14, all directly in fluid communication between them through the passages 18) is reduced, through the pressure reducing device 30, up to the desired depressurization value.

The last slab $L^{IV}$ passes through the room 14. It should be noted the length of the processing room 14, i.e. the dimension corresponding to the moving direction of the slabs in the machine, is lower than the dimensions of the single sealed chambers.

When the slab $L^{IV}$ passes in the room 14, the surface processing device 26 is actuated and the surface finishing material is thus deposited on the slab.

The processing can provide for more coats, i.e. when the slab $L^{IV}$ arrives in the second chamber 13 the movement of the conveyor belt 19 is reversed and the slab is brought again in the first chamber for a further finishing. After that, the movement of the conveyor belt 19 is reversed again and the slab returns in the second chamber 13 (if necessary, a third finishing can be also applied). This forwards/backwards movement is performed based on the specific needs.

For processing the slab $L^{IV}$, this latter is stopped in the second chamber 13 (the slab $V^{IV}$ is schematized with a broken line in FIG. 2), where the respective vertical moving device 20 lifts the slab $V^{IV}$ up to the next level.

In the first chamber 12, the slab L''' is lowered by one level up to the moving plane. From here, the slab moves and is processed in the same manner as the slab $L^{IV}$ up to the second chamber 13, where it is lifted by one level through the respective moving device.

It is therefore clearly apparent that the maximum number of slabs that can be processed in the machine is equal to N+1 for each closing of the doors.

Once all the slabs have been processed and brought to the second chamber 13, the doors are opened and the slabs exit one by one from the second opening, with a reversed sequence with respect to the sequence of insertion into the first chamber; it is therefore clearly apparent that the machine works according to a FIFO (first in-first out) logic.

It should be noted that, as shown in FIG. 5, the invention also provides for the case of a single chamber 112 where the slabs are arranged over one another, without the need of depositing a material onto the slabs, only performing a depressurization processing, where the slabs do not move and statically remain still for the processing time necessary for the depressurization to perform its function, for example for enhancing the infiltration of the epoxy resin in slabs of stone material.

In this example, the only chamber 112 comprises an entrance first opening 115 for a support-slab L, and an exit second opening 116 for a support-slab L. Analogously to what described above, the chamber comprises a plan moving device 119, analogous to the device 19, and an analogous moving device 120. A pressure adjusting device 130 is obviously provided.

The slabs are inserted in the same manner as they are inserted in the first chamber 12, as described above. The chamber is pressurized up to achieve the desired pressure limit; then it is opened and the slabs exit according to the same logics that, in this case, are obviously LIFO (Last in—First out) logics. The processing capacity of this room is N+1 (in this example again N is equal to 3).

It is clearly apparent that the processing machine of the first example, i.e. the machine of FIGS. 2 to 4, can be used for the same processing of the second example (FIG. 5), i.e. a processing where the slabs do not move and remain still up to achieve a given processing pressure. In this case, it is sufficient to fill both the chambers 12 and 13 with the slabs (firstly the second chamber 13 and then the first chamber 12) and to adjust the pressure inside the chambers. In this case, the number of processable slabs is equal to 2*(N+1), that is 8 slabs in the illustrated example.

Therefore, with the machine of the invention, providing for contemporaneously inserting more products into the processing machine, it is possible the surface processing of products in less time than in the prior art, as at least the time necessary for closing and opening the doors is saved, as well as the time for achieving the working pressure, the time for keeping/processing the slabs under the achieved working pressure, the time for achieving the ambient pressure again.

Furthermore, the configuration also allows to reduce the overall bulk with respect to the cases where more parallel lines are provided in the plant for performing more processing in parallel.

It is understood that what is illustrated purely represents possible non-limiting embodiments of the invention, which may vary in forms and arrangements without departing from the scope of the concept on which the invention is based. Any reference numerals in the appended claims are provided for the sole purpose of facilitating the reading thereof in the light of the description above and the accompanying drawings and do not in any way limit the scope of protection.

The invention claimed is:

1. A processing machine for the surface processing of products, the processing machine comprising:
    at least one sealed chamber, provided with at least one opening, that can be closed, for inserting and removing a plurality of products to be processed;
    a device for reducing the pressure inside said at least one sealed chamber up to a value lower than the ambient pressure;
    in said at least one sealed chamber, a moving device for moving said products from the bottom upwards and in reverse, the moving device comprising levels so as to accumulate in said at least one sealed chamber at least two of said products on the levels arranged over one another;
    a plan moving device for moving said products from and towards said at least one opening when the products are arranged at the same level of said at least one opening, wherein, from an operational viewpoint, a plurality of said products are inserted into said at least one sealed chamber, and at least two products of said plurality of products are put over one another for a span of processing, and wherein, once all the products to be processed have been inserted into said at least one sealed chamber, said at least one sealed chamber is closed and the pressure inside is decreased up to an operational processing pressure, and then said at least one sealed chamber is opened again and the products are removed therefrom.

2. The processing machine of claim 1, further comprising at least two said sealed chambers connected to each other, each chamber being adapted to receive a plurality of said products arranged over one another.

3. The processing machine of claim 2, wherein a surface processing device for processing a product is arranged between said at least two sealed chambers.

4. The processing machine of claim 3, wherein between said at least two sealed chambers a processing room is provided, where said surface processing device is arranged, so that the products are adapted to move from a chamber to the following one passing through said room, realizing said processing.

5. The processing machine of claim 3, wherein said plan moving device is adapted to allow the products to pass from a chamber to the following one under the processing device.

6. The processing machine of claim 5, wherein said plan moving device is common to said chambers, said plan moving device is a conveyor belt crossing said chambers from an entrance first opening of the machine up to an exit second opening of the machine, passing under the processing device.

7. The processing machine of claim 2, wherein only said at least two sealed chambers are provided in succession.

8. The processing machine of claim 2, wherein in each sealed chamber said moving device is provided for moving said products from the bottom upwards so as to accumulate at least two said products on levels arranged over one another.

9. The processing machine of claim 8, wherein in said at least two sealed chambers there is defined a moving plane for moving said products from the entrance to the exit of the processing machine, crossing said at least two sealed chambers passing under a surface processing device, wherein each bottom-upwards moving device defines N positions raised from said moving plane, and wherein the maximal number of products that can be processed in the processing machine is N+1.

10. The processing machine of claim 2, wherein said surface processing device is a vacuum painting device, a vacuum plasma processing device, a resin applying device.

11. The processing machine of claim 1, further comprising a first opening for the products entering the processing machine, defined in a first of said at least one sealed chamber, and a second opening for the products exiting the processing machine, defined in a second of said at least one sealed chamber, respective sealing doors being provided associated with said openings.

12. The processing machine of claim 1, wherein each product is borne by a respective support, so that said products enter and exit said machine on said supports, and wherein said bottom-upwards moving device and said plan moving device are adapted to move said products by directly moving said supports.

13. The processing machine of claim 1, wherein each product is a form of slab, made of stone, glass, wood, ceramic or metal.

14. The processing machine of claim 1, wherein the moving device is configured to move each of the products simultaneously in the at least one sealed chamber.

15. The processing machine of claim 1, wherein the at least one sealed chamber defines a single chamber interior space, the moving device being configured to move the products in the single chamber interior space.

* * * * *